United States Patent [19]

Babler

[11] 4,141,881

[45] Feb. 27, 1979

[54] PROCESS FOR DYEING LINEAR POLYESTERS IN THE MELT

[75] Inventor: Fridolin Bäbler, Allschwil, Switzerland

[73] Assignee: Ciba-Geigy Corporation, Ardsley, N.Y.

[21] Appl. No.: 816,838

[22] Filed: Jul. 18, 1977

[30] Foreign Application Priority Data

Jul. 22, 1976 [CH] Switzerland .......................... 9390/76

[51] Int. Cl.² .......................... C08K 5/09; C08K 5/15; C08K 5/34
[52] U.S. Cl. ...................................... 260/40 P; 546/37
[58] Field of Search ............................ 260/40 P, 241 P

[56] References Cited

U.S. PATENT DOCUMENTS

| 3,006,882 | 10/1961 | Altermatt et al. | 260/281 P |
| 3,104,233 | 9/1963 | Altermatt | 260/40 P |
| 3,112,289 | 11/1963 | Stocker | 260/42.21 |
| 3,372,138 | 3/1968 | Bowman et al. | 260/40 P |
| 3,842,084 | 10/1974 | Graser | 260/281 P |

FOREIGN PATENT DOCUMENTS 967178 8/1964 United Kingdom.

*Primary Examiner*—Sandra M. Person
*Attorney, Agent, or Firm*—Joseph F. Di Prima

[57] ABSTRACT

Process for dyeing linear polyesters in the melt in brilliant deeply colored and highly light-fast dyeings, which process comprises using as dyeing agent a mixture consisting of 0.001–0.2% by weight, relative to the amount of polyester, of a perylene-3,4,9,10-tetracarboxylic acid derivative, and one or more dyes which differ from this derivative and which are soluble in polymers.

11 Claims, No Drawings

PROCESS FOR DYEING LINEAR POLYESTERS IN THE MELT

It has been found that unexpectedly brilliant, deeply coloured and highly light-fast dyeings in linear polyesters dyed in the melt are obtained if as dyeing agent is used a mixture comprising 0.001–0.2% by weight, preferably 0.005–0.1% by weight, relative to the amount of polyester, of a perylene-3,4,9,10-tetracarboxylic acid derivative, particularly of a perylene-3,4,9,10-tetracarboxylic acid dianhydride or of a perylene-3,4,9,10-tetracarboxylic acid diimide, and one or more dyes which differ from these and which are soluble in polymers.

There can be used, for example, perylene-3,4,9,10-tetracarboxylic acid dianhydride, the alkali salts or esters of perylene-3,4,9,10-tetracarboxylic acid, unsubstituted perylene-3,4,9,10-tetracarboxylic acid diimide, preferably however perylene-3,4,9,10-tetracarboxylic acid dialkylamines, dicycloalkylamides, diarylamides, diimides derived from heterocyclic amines, dihydrazides, dioximes, as well as mixed crystals thereof. In the case of all these pigments moreover, the perylene nucleus can optionally be substituted by 1–4 halogen atoms.

Of particular interest are bis-phenylimides, which in the phenyl groups may optionally also contain substituents, for example halogen atoms, alkyl or alkoxy groups having 1–18 C atoms, or cycloalkyl or cycloalkoxy groups having 4–6 C atoms.

The perylene-3,4,9,10-tetracarboxylic acid dialkylimides contain in the alkyl groups preferably 1–20 C atoms, and the dicycloalkylimides preferably 5–6 C atoms.

The diimides mentioned are known compounds which can be obtained by condensation of the perylene-tetracarboxylic acid dianhydride, in the molar ratio 1:2, with corresponding monoamine, hydrazide or hydroxylamine; examples are: methylamine, ethylamine, n-propylamine, isopropylamine, γ-methoxypropylamine, n-butylamine, n-hexylamine, cyclohexylamine, n-octylamine, n-dodecylamine, n-octadecylamine, aniline, 2-, 3- or 4-methylaniline, 4-ethylaniline, 4-isopropylaniline, 4-cyclohexylaniline, 2,5- or 3,5-dimethylaniline, 2,4,6-trimethylaniline, 3- or 4-chloroaniline, 2,5-dichloroaniline, 2,4-dichloroaniline, 3,4-dichloroaniline, 4-fluoroaniline, 3-bromoaniline, 3-iodoaniline, 4-methoxyaniline, 4-ethoxyaniline, 4-n-propoxyaniline, 4-n-butoxyaniline, 4-phenoxyaniline, 4-(2′,4′-dimethylphenoxy)-aniline, 3-methyl-4-phenoxyaniline, 4-phenylmercaptoaniline, 4-phenylamino-aniline, 2-aminopyridine, 2-, 4- or 8-aminoquinoline, 1-aminoisoquinoline, 2-amino-4-methylpyridine, 3-amino-5-methyl-triazole-1,2,4, 5-amino-1-phenylpyrazole, 2-amino-1,3,4-thiadiazole, benzoylhydrazine, p-chlorobenzoylhydroxylamine.

The dyeing agent contains, in addition to the perylenetetracarboxylic acid derivative, a thermostable dye different from this derivative and soluble in polymers, which dye can belong to the most varied classes of dyes, for example it can belong to the anthraquinone, azo, azomethine, phthalocyanine, perinone, azine, dioxazine, thioindigo, nitro, methine, triazine or quinacridone series.

Examples of representatives of the anthraquinone series which may be mentioned are the amino-, alkylamino-, cyclohexylamino-, hydroxyalkylamino and phenylaminoanthraquinones, all of which are known as disperse dyes and particularly as polymer-soluble colouring substances, which can also contain, as further auxochromes, hydroxy groups or phenylmercapto groups.

As examples may be given the arylamino- and aminohydroxy-anthraquinones mentioned in the French Patent Applications Nos. 2,081,678 and 2,081,688; the 1,4-diphenylamino-5,8-dihydroxyanthraquinones mentioned in the German Offenlegungsschrift No. 2,021,768; the cyclohexylamino- and toluidinoanthraquinones given in the U.S. Pat. No. 3,478,041; the reaction products from aminoanthraquinones with monohalogenoaryl ketones mentioned in the German Auslegeschrift No. 1,128,066; the phenylmercaptoanthraquinones mentioned in the German Auslegeschrift No. 1,282,933; or the anthrapyridones described in the GB Patent Specification No. 1,314,085 or in the German Offenlegungsschrift No. 2,431,578.

Further examples of suitable anthraquinone dyes are vat dyes, provided they are sufficiently soluble in polyester, for example acylaminoanthraquinones, such as 1-benzoylaminoanthraquinone, 1,5-di-benzoylaminoanthraquinone and 2,4-bis-(α-anthraquinonylamino)-6-phenyl-1,3,5-triazines.

From the azo series may be mentioned the azo dyes usable for the melt dyeing of polyesters, which azo dyes are obtained by the coupling of diazotised anilines or heterocyclic amines with dialkylanilines, pyrazolones or pyridones, such as are mentioned, for example, in the GB Patent Specification No. 1,326,941.

In addition may be mentioned 1:2 metal complexes, especially chromium and cobalt complexes, of o,o-dihydroxymonoazo dyes, as are mentioned for example in the Swiss Patent Specification No. 508,005.

Dyes from the azomethine class which may be mentioned are in particular the aldimines from salicylaldehydes or 2-hydroxy-1-naphthaldehyde with mono- or diaminobenzenes, as well as metal complexes thereof.

Examples of suitable phthalocyanines soluble in polymers are the alkyl- or alkoxyalkylamides of Cu-phthalocyaninetri- or tetrasulphonic acid.

Representatives of methine dyes which may be mentioned are the methylene-bis-pyrazolones, such as are described, for example, in the U.S. Pat. No. 3,785,769; or the condensation products from cyanomethyl-benzimidazolones and isoindolinones disclosed by the GB Patent Specification No. 1,403,510; or the condensation products from malonitrile and dialkylaminobenzaldehyde, which have become known by virtue of many patent specifications.

Examples of perinones which may be mentioned are the condensation products from 1,8-naphthalinedicarboxylic acids with o-phenylene-diamines.

Finally, as an example of a triazine dye there may be mentioned 2,4-di-(2′-hydroxynaphthyl)-6-pyrenyl-1,3,5-triazine.

The ratio of dye soluble in polymers to polyester can vary within wide limits depending on the depth of colour desired. The use of 0.005–2 parts of dye to 100 parts of polyester is in general recommended.

It is in every case essential that both the perylenetetracarboxylic acid derivative and the dye concomitantly used be completely dissolved in the polymer.

The perylenetetracarboxylic acid derivative can be mixed either before or during the dyeing process with the dye soluble in polymers. If mixing occurs before the dyeing process, it can be effected with the addition of a carrier.

There may be mentioned as suitable linear polyesters in particular those which are obtained by polycondensation of terephthalic acid, or esters thereof, with glycols of the formula HO-$(CH_2)_n$-OH, wherein n represents the number 2–10, or with 1,4-di-(hydroxymethyl)-cyclohexane; or by polycondensation of glycol ethers of hydroxybenzoic acids, for example p-($\beta$-hydroxyethoxy)-benzoic acid. The term 'linear polyesters' covers also copolyesters which are obtained by partial replacement of the terephthalic acid by another dicarboxylic acid or by a hydroxy-carboxylic acid, and/or by partial replacement of the glycol by another diol.

Of particular interest are however the polyethylene terephthalates.

The linear polyesters to be dyed are advantageously intimately mixed in the form of powder, chips or granules with the dyes. This can be effected for example by coating the polyester particles with the dry finely divided dye powder; or by treating the polyester particles with a solution or dispersion of the dyes in water or in an organic solvent, and subsequently removing the solvent. The polyester particles treated in this way were melted, by known processes, in an extruder and then pressed out to form objects, especially sheets or fibres, or cast to form plates. Instead of using the pure dyes, it is possible to advantageously use preparations containing, besides the dye, 20–80% of a carrier, for example a polyethylene terephthalate such as is used for producing fibres, or a polyethylene terephthalate having a lower softening point, or a polystyrene having a softening point above 100° C.

Finally, it is also possible to add the dyeing agent directly to the melted polyester, e.g. by the injection process.

The polyesters obtainable according to the invention contain the perylenetetracarboxylic acid derivative and the dye, soluble in polymers, in the dissolved state. The dyeings are distinguished by high intensity, levelness, purity and brilliance and by good fastness to light, despite the very minute proportion of perylene compound used.

The textile properties and textile fastness of the staple fibres dyed by the process of the invention are not impaired by the addition of the perylene compounds.

The fibres dyed in the melt according to the invention can be cross-dyed in the usual manner.

It is surprising that the dyeings obtained by the process according to the invention display, in spite of the fact that only traces of the perylene compounds are added, such intense shading effects and high brilliance and have such good fastness properties, particularly in the light of the Swiss Patent Specification No. 565.218, wherein it is stated that perylenetetracarboxylic acid-bis-arylimides, such as bis-phenylimide, bis-p-chlorophenylimide, bis-3,5-dimethylphenylimide is bis-p-ethoxyphenylimide, produce in plastics only dull red dyeings.

Except where otherwise stated in the following Examples, 'parts' signify parts by weight, percentages are percent by weight, and the temperatures are in degrees Centigrade.

EXAMPLE 1

1000 parts of polyethylene terephthalate granulate (Terlenka, lustrous), 10 parts of blue copper phthalocyanine-tetrasulphonic acid-(3-methoxypropyl)-amide and 0.4 part of perylenetetracarboxylic acid-bis-(p-chlorophenyl)-imide are thoroughly mixed together for about 15 minutes in a mixing drum, and afterwards the mixture is dried for about 24 hours at 100° C. in vacuo (15 mm Hg column). The granulate treated in this manner is subsequently spun at about 290° C. in the melt spinning process. There are obtained blue-dyed fibres which display, compared with the fibres dyed at the same concentration without perylene pigment, a considerably higher brilliance and an intensely bluer dyeing, with the good textile properties being retained. The fastness to light of the fibres dyed in this way is excellent.

EXAMPLE 2

100 parts of 2,5-bis-($\alpha$-anthraquinonylamino)-4-phenyl-1,3,5-triazine are well mixed with 4 parts of perylenetetracarboxylic acid dianhydride for about 15 minutes in a Turbula mixer from the firm Bachofen, Basle. 10 parts of this dye mixture are thoroughly mixed in 1000 parts of polyethylene terephthalate (diols, lustrous) for about 15 minutes in a mixing drum, and subsequently dried for about 24 hours at 100° C. in vacuo (15 mm Hg column). The granulate treated in this manner is spun at about 290° C. in the melt spinning process. From the above dye mixture are obtained golden-yellow-dyed fibres which, compared with the fibres dyed at the same concentration without the perylene pigment, have a considerably higher brilliance and purer shade, whilst retaining the good textile properties. The fastness to light of these fibres dyed in the manner described is likewise excellent (Xenotest, exposure time = 1000 hours: rating above 7).

EXAMPLES 3–14

If the procedure described in Example 1 is carried out except that there is used the perylenetetracarboxylic acid derivative which is listed in the following Table and which corresponds to the formula

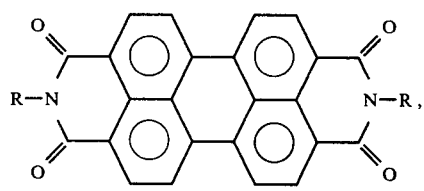

wherein R has the meaning given in column 3 of the Table, in admixture with the respective dye soluble in polymers, shown in column 5, dyed polyester fibres having the respective shade given in column 6 and possessing equally good properties are obtained.

| Ex. | Parts | R | Parts | Dye soluble in polymers | Shade |
|---|---|---|---|---|---|
| 3 | 0.01 | H— | 10 | 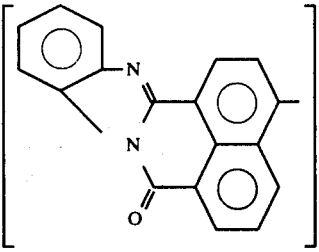 | brilliant yellow |
| 4 | 0.05 | 3,5-dimethyl-phenyl- | 10 | " | " |
| 5 | 0.05 | $CH_3$— | 10 | " | " |
| 6 | 0.1 | p-methoxy-phenyl- | 10 | " | " |
| 7 | 0.2 | p-methoxy-phenyl- and p-ethoxy phenyl- | 10 | " | golden yellow |
| 8 | 0.3 | p-aminophenyl- | 10 | 2,6-dimethoxy-9,10-di-benzoyl-triphen-dioxazine | deeply coloured brilliant red |
| 9 | 0.4 | benzoylamino- | 10 | 2,4-di-(2'-hydroxy-naphthyl)-6-pyrenyl-1,3,5-triazine | golden yellow |
| 10 | 0.5 | 4-methyl-quinolinyl-2- | 10 | 1,5-di-p-phenoxy-phenyl-anthraquinone | deeply coloured violet |
| 11 | 0.7 | 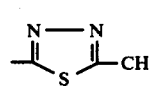 | 10 | 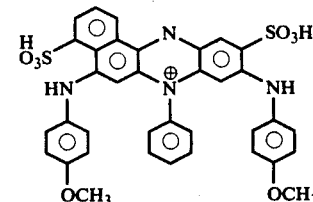 | deep blue |
| 12 | 0.8 | cyclohexyl- | 10 | 2,4-di-α-anthraquino-nyl-6-phenyl-1,3,5-triazine | golden yellow |
| 13 | 1.0 | n-butyl- | 10 | 2,4-di-α-anthraquino-nyl-6-phenyl-1,3,5-triazine | golden yellow |
| 14 | 2.0 | n-octadecyl- | 10 | " | " |
| 15 | 0.5 | 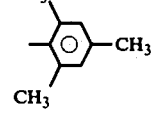 | 0.5 | 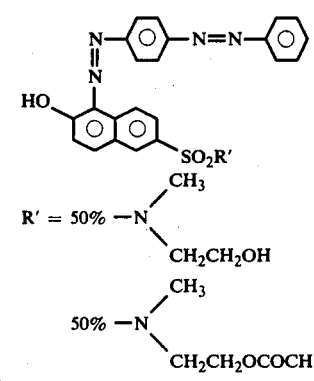 | brilliant scarlet red |
| 16 | 0.8 | 4-chloro-benzoyl- | 1.0 | 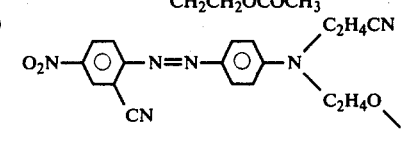 | brilliant scarlet red |
| 17 | 0.3 | quinolinyl-2- | 20 | [CuPc]-[$SO_2HNCH_2CH_2CH_2OCH_3$]$_4$ | brilliant blue |
| 18 | 0.5 | pyridyl-2- | 5 | 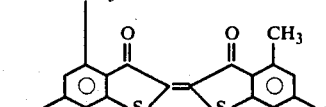 | brilliant red |

EXAMPLE 19

(a) 240 g of polyethylene terephthalate powder and 60 g of yellow 2,4-di-(2'-hydroxynaphthyl)-6-pyrenyl-1,3,5-triazine and 3 g of perylene tetracarboxylic acid-di-(p-chlorophenyl)-imide are mixed for 1½ hours in a 2 liter container on a roller stand. The mixture is dried in a vacuum cabinet at 80° C. for 48 hours. The mixture is subsequently extruded on a single screw extruder (screw diameter = 20 mm, L:D = 20, temperature = 230° C.) to give a thread having a diameter of 2 mm, and this is cut on a cutting machine into the form of cylindrical granules 2–3 mm in length. The granules obtained contain 20% of dye.

(b) If 20 parts of this preparation are mixed, according to the process given in Example 1, with the polyethylene terephthalate granulate, and the mixture is spun at about 290° C., fibres dyed golden yellow are obtained.

EXAMPLE 20

If there are used in Example 19, instead of the yellow dye, equal parts of a mixture consisting of approximately equal parts of the dyes of the formulae

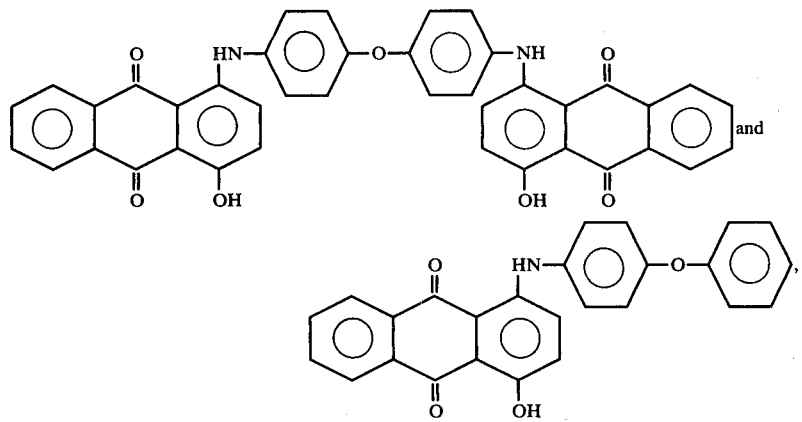

the production of which is described in GB Patent Specification No. 1,463,479, a preparation giving polyester fibres dyed navy blue are obtained.

EXAMPLE 21

In a divided trough kneader are kneaded during 5 hours at a temperature of 70°–75° C.:
- 100 parts of 2-phenyl-4,6-di-(α-anthraquinonyl-amino)-1,3,5-triazine,
- 5 parts of perylenetetracarboxylic acid-bis-p-chloro-aniline,
- 500 parts of finely ground sodium chloride,
- 150 parts of a polyester having a melting range of 80°–130° C. (Dynapol L 206, Dynamit Nobel), and
- 100 parts of diacetone alcohol.

The kneaded mixture is converted by the addition of 100 parts of water into a coarse granulate, and this is subjected, to obtain the finest possible granulation, to wet grinding in a toothed colloid mill. The resulting suspension is filtered, and washed with water until free from salt and solvent, and the filter cake is dried at 70° C. in a vacuum cabinet. The slightly sintered dried material is pulverised. The powder can be used as such, or it can be remelted in an extruder to obtain granules.

The resulting yellow preparation contains 40% of dye and can be used in the form either of powder or of granules. Polyester fibres dyed golden yellow are obtained with this preparation in the process described in Example 1.

I claim:

1. Process for dyeing linear polyester polymers in the melt, which process comprises using as a dyeing agent a mixture consisting of 0.001–0.2% by weight, relative to the amount of polyester, of a polyester soluble perylene - 3, 4, 9, 10-tetracarboxylic acid pigment derivative, and one or more non-perylene- 3, 4, 9, 10 - tetracarboxylic acid derivative dyes which are thermostable and soluble in said linear polyester polymers.

2. Process according to claim 1, wherein a perylene-3,4,9,10-tetracarboxylic acid dianhydride or perylene-3,4,9,10-tetracarboxylic acid diimide is used.

3. Process according to claim 2, wherein is used a perylene-3,4,9,10-tetracarboxylic acid-di-phenylimide unsubstituted or substituted in the phenyl groups by halogen atoms, alkyl or alkoxy groups having 1–18 C atoms, or cycloalkylalkoxy groups having 4–6 C atoms.

4. Process according to claim 1, wherein 0.005–0.1% by weight of the perylenetetracarboxylic acid dianhydride or perylenetetracarboxylic acid diimide is used.

5. Linear polyester polymers dyed according to the process of claim 1, containing 0.001–0.2% by weight, relative to the amount of polyester, of at least one polyester soluble perylene - 3, 4, 9, 10 -tetracarboxylic acid pigment derivative, and at least one or more non-perylene- 3, 4, 9, 10 - tetracarboxylic acid derivative dyes which are thermostable and soluble in said linear polyesters.

6. Process according to claim 1, wherein 0.005–2% by weight, relative to the polyester, of said non-perylene-3, 4, 9, 10-tetracarboxylic acid derivative dye is used.

7. Linear polyester polymers according to claim 5, containing 0.005–2% by weight, relative to the polyester, of said non-perylene- 3, 4, 9, 10-tetracarboxylic acid derivative dye.

8. Process according to claim 6, wherein said dye is an anthraquinone, azo, azomethine, phthalocyanine, perinone, azine, dioxane, thioindigo, nitro, methine or quinacridone dye.

9. Linear polyester polymers according to claim 7, wherein said dye is an anthraquinone, azo, azomethine, phthalocyamine, perinone, azine, dioxazine, thioindigo, nitro, methine or quinacridone dye.

10. A process according to claim 8, wherein said linear polyester polymer is polyethylene terephthalate.

11. A process according to claim 9, wherein said linear polyester polymer is polyethylene terephthalate.

* * * * *